United States Patent [19]

Voornas

[11] 3,947,920
[45] Apr. 6, 1976

[54] MACHINE FOR SEPARATING MEAT TISSUE FROM BONE

[75] Inventor: Nicholas Michael Voornas, Evanston, Ill.

[73] Assignee: Midaco Corporation, Elk Grove Village, Ill.

[22] Filed: Mar. 29, 1974

[21] Appl. No.: 456,358

[52] U.S. Cl. .................................. 17/21; 17/1 G
[51] Int. Cl.² ........................................ A22B 5/16
[58] Field of Search ............ 17/21, 18, 46, 1 G, 56; 30/123 R, 123.5; 99/584

[56] References Cited
UNITED STATES PATENTS

| | | | |
|---|---|---|---|
| 1,741,332 | 12/1929 | Pearl | 17/1 G |
| 2,620,510 | 12/1952 | Darrow et al. | 17/21 X |
| 2,817,862 | 12/1957 | Frazho et al. | 17/1 G X |
| 2,912,027 | 11/1959 | Townsend | 17/21 X |
| 3,249,139 | 5/1966 | Runnells et al. | 17/21 X |
| 3,324,915 | 6/1967 | Townsend | 17/21 |
| 3,545,036 | 12/1970 | Fischer et al. | 17/1 G |

FOREIGN PATENTS OR APPLICATIONS

| | | | |
|---|---|---|---|
| 481,173 | 1952 | Canada | 17/21 |
| 474,282 | 1951 | Canada | 17/21 |

*Primary Examiner*—Richard C. Pinkham
*Assistant Examiner*—William R. Browne
*Attorney, Agent, or Firm*—Thomas R. Vigil

[57] ABSTRACT

The machine includes a horizontally extending knife blade, a mechanism for reciprocating the knife blade, a toothed roll parallel spaced from the knife blade, a mechanism for rotating the roll, and a manually operated lever mechanism for moving the rotating roll to and away from a position closely adjacent the knife blade. The rotating roll engages the bone of a section of meat to feed the section of meat downwardly past the cutting edge of the knife blade while an operator manually operates the lever mechanism to simultaneously urge the bone toward the knife blade thereby to ensure efficient separation of meat tissue from bone.

23 Claims, 7 Drawing Figures

MACHINE FOR SEPARATING MEAT TISSUE FROM BONE

BACKGROUND OF THE INVENTION

The present invention relates to a machine for separating meat tissue from bone in a section of meat. The machine is semiautomatic and is of the type where an operator will place a section of meat in proper position on the machine and then manually actuate and operate other mechanisms of the machine to effect an efficient separation of the meat tissue from the bone of the section of meat.

Heretofore, various machines and mechanisms have been proposed for speeding up the process of separating meat tissue from bone while at the same time providing an effective separation of meat tissue from bone with little waste meat tissue left clinging to the bone. Examples of previously proposed machines and mechanisms for ensuring an effective separation of meat from bone and/or for speeding up the process of separating meat tissue from bone are disclosed in the following patents:

United States Patents

| | | |
|---|---|---|
| 2,798,251 | A. LOTT | July 9, 1957 |
| 3,396,768 | SHINJI KURIHARA | Aug. 13, 1968 |
| 3,581,336 | J.F.HERUBEL | June 1, 1971 |
| 3,708,828 | CAIN, et al. | Jan. 9, 1973 |

The semiautomatic machine of the present invention provides an advantage over the previously proposed machines in that while utilizing powered mechanisms for speeding up the cutting operation and for feeding the section of meat past a knife blade, the machine also provides for manual control of the feeding of the section of meat past a knife blade whereby an operator can manually maintain the bone of the section of meat closely adjacent the cutting edge of the knife blade while the section of meat is being fed past the knife blade.

SUMMARY OF THE INVENTION

According to the invention, there is provided a semiautomatic machine for separating tissue from bone in a section of meat, the machine comprising a framework having an open top, an elongate knife blade having an upwardly facing cutting edge, the knife blade being supported by the framework and extending generally horizontally between opposite sides of the framework adjacent the top of the framework, manually actuated mechanisms and a manually operated mechanism supported by the framework and movable to and from a position adjacent the knife blade for moving a section of meat positioned thereagainst generally horizontally toward and downwardly past the cutting edge of the knife blade and such that the bone in the section of meat is moved downwardly closely adjacent the cutting edge of the knife blade whereby the tissue in the section of meat is efficiently and speedily separated from the bone.

Preferably, the actuated mechanisms include a toothed roll, a motor for rotating same and a motor for reciprocating the knife blade. The manually operated mechanism includes a lever coupled to pivotally mounted swing arms rotatably supporting the toothed roll. Two limit switches are located adjacent the path of movement of the lever.

In operation, an operator places a section of meat including bone and meat tissue above the cutting edge of the knife blade with the bone situated adjacent the toothed roll. The operator then moves the lever which first trips the switch for energizing the motor which reciprocates the knife blade and second trips the switch for energizing the motor for rotating the toothed roll. Further movement of the lever by the operator urges the rotating toothed roll against the bone thereby to urge the bone against the knife blade as the rotating roll urges the meat section downwardly past the knife blade such that the bone is caused to move downwardly closely adjacent the knife blade to ensure an efficient separation of meat tissue from the bone.

A BRIEF DESCRIPTION OF THE DRAWINGS

DESCRIPTION OF THE PREFERRED EMBODIMENT OF THE INVENTION

Figure 1:
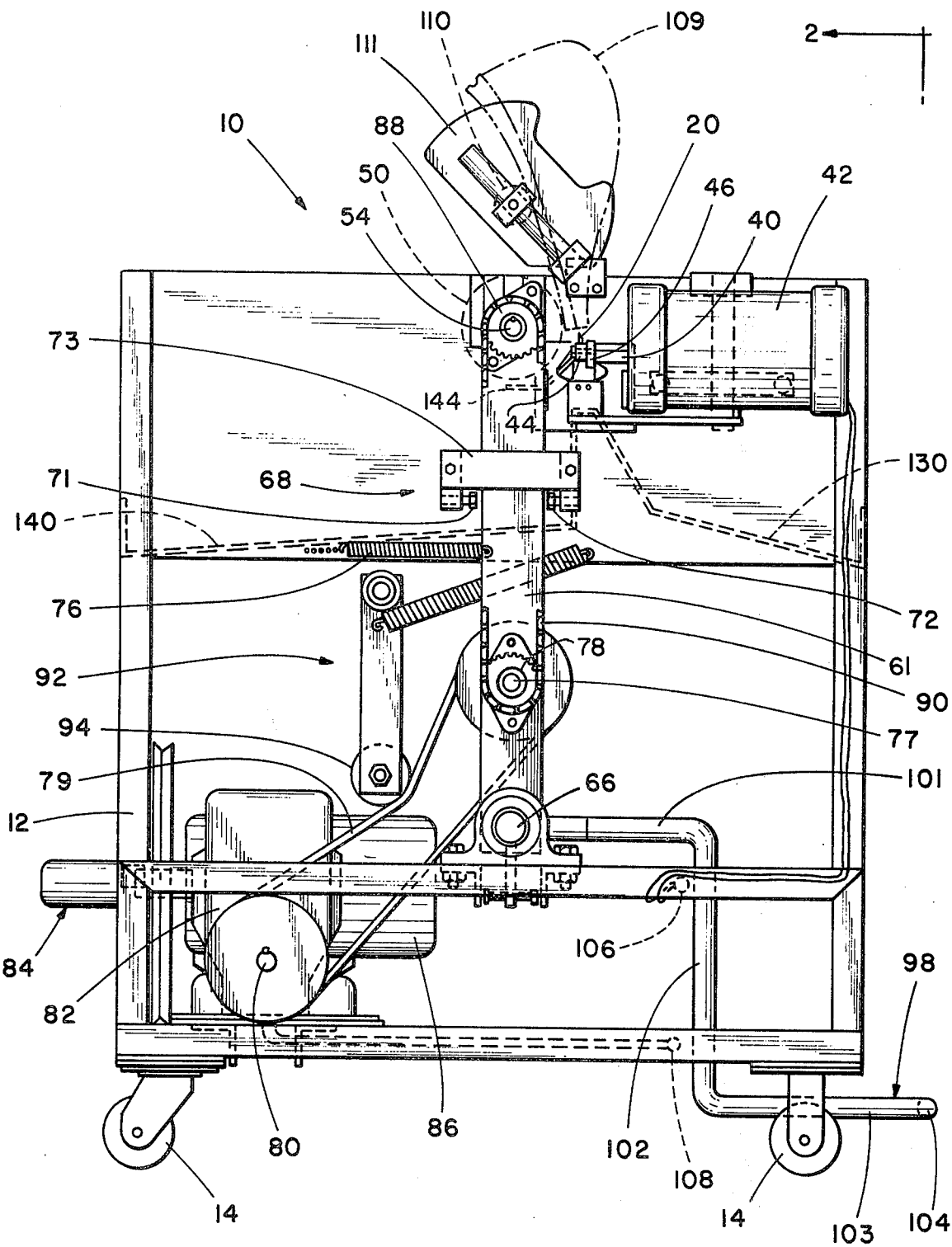
FIG. 1 is a side view of one embodiment of the machine of the invention.

Referring now to the drawings in greater detail, a side view of the machine which is generally designated by the reference numeral 10 is shown in FIG. 1. The machine 10 includes a generally rectangular framework 12 which, in the illustrated embodiment is supported on four casters 14 which enable the machine 10 to be moved to any desired location. Of course, it will be understood that legs or other supports can be utilized instead of casters, particularly when the machine 10 is going to be fixed at one operating location.

Figure 2:
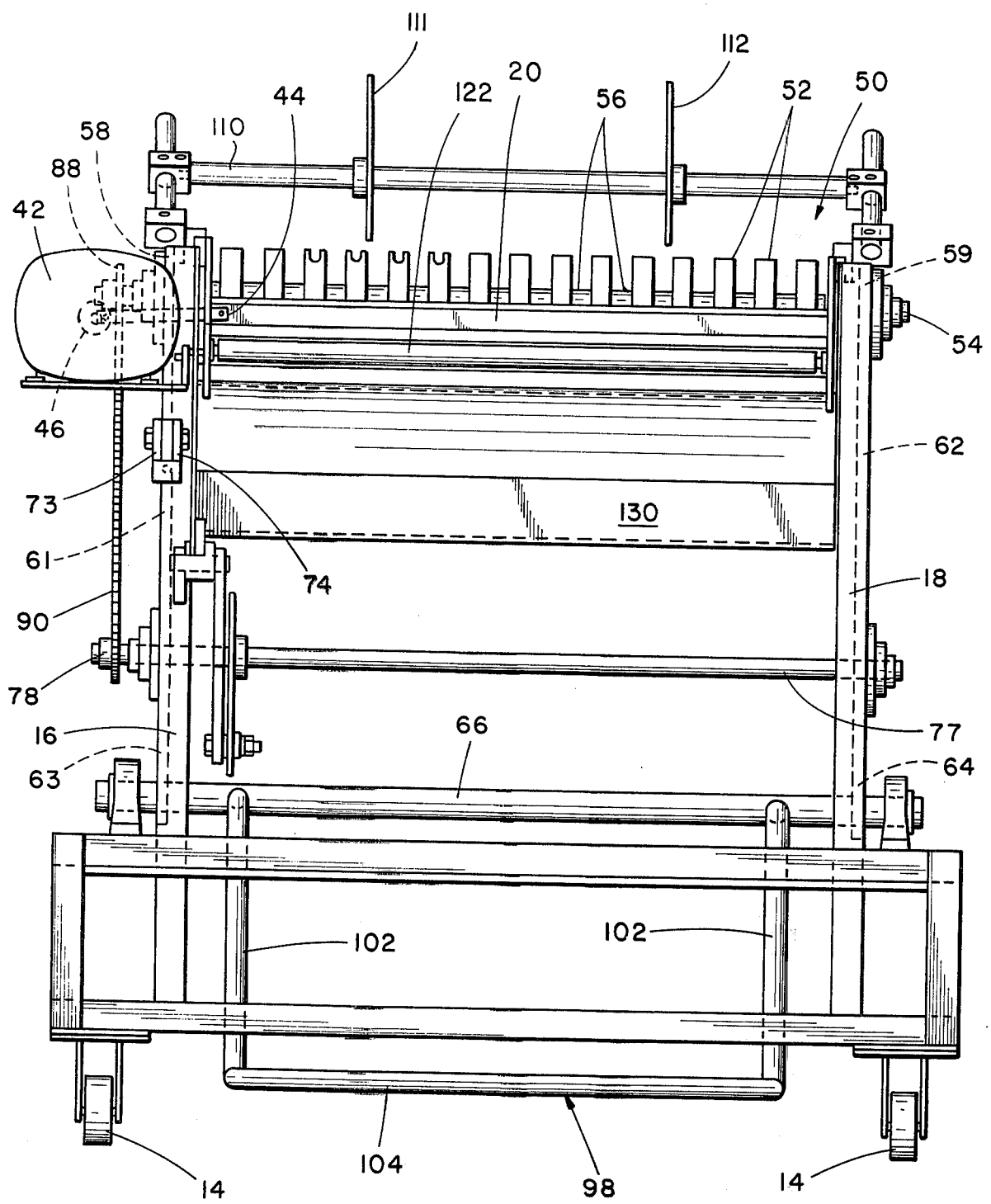
FIG. 2 is a front view of the machine shown in FIG. 1 viewing the machine along the line 2—2 of FIG. 1.
Figure 3:
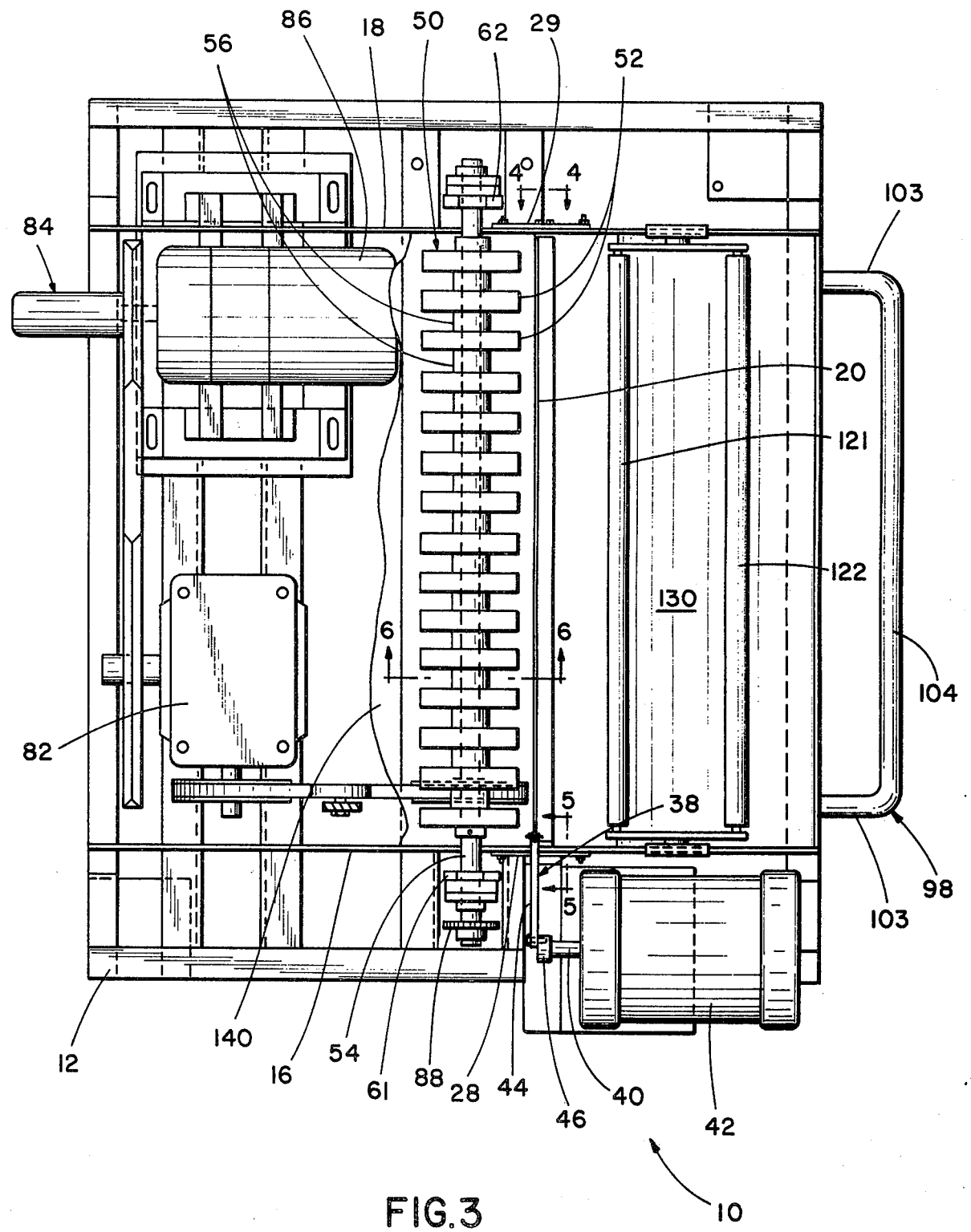
FIG. 3 is a top plan view of the machine shown in FIG. 1.
Figures 4, 5:
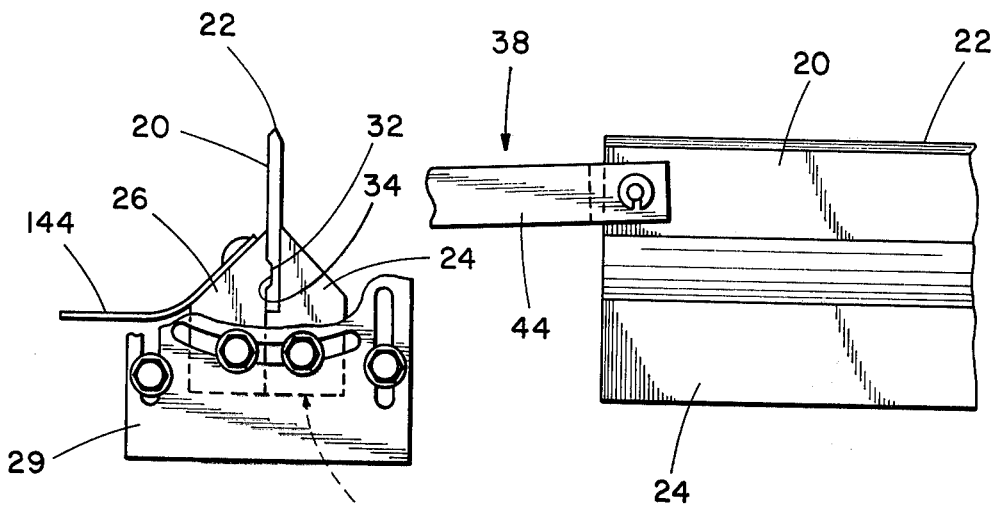
FIG. 4 is an end view of the knife blade and holder therefor taken along line 4—4 of FIG. 3.
FIG. 5 is a fragmentary view of one end of the knife blade and a portion of a link which is connected between the knife blade and an eccentric drive for reciprocating the knife blade and is taken along line 5—5 of FIG. 3.

As best shown in FIGS. 2 and 3, machine 10 has an open top between opposite sides 16 and 18 of the framework 12 and a knife blade 20 extends horizontally between the opposite sides 16 and 18 of the framework 12 a short distance below the top of the machine. Referring to FIG. 4, it is to be noted that the knife blade 20 has an upwardly facing cutting edge 22 and is supported in an elongate holder 23 formed from two elongate blocks 24 and 26 fastened together at each end thereof by suitable fasteners which also hold the holder 23 to end plates 28 and 29 secured respectively to the sides 16 and 18 of the framework 12 (FIG. 3). The blocks 24, 26 are configured so as to form a slot 30 therebetween. Also, the block 26 has a rib 32 extending the length thereof and projecting into the slot 30. The blade 20 has a mating groove 34 and together the rib 32 and groove 34 form a tongue and groove arrangement for preventing vertical movement of the knife blade 20 in the holder 23.

The dimensions of the slot 30 and the knife blade 20 are such as to permit horizontal sliding movement of the blade 20 in the slot 30. With reference to FIGS. 2, 3 and 5 it will be understood that the end of the blade 20 on the side 16 of the framework 12 is connected by a linkage assembly 38 to the shaft 40 of a motor 42. The linkage assembly 38 includes a link 44 pivotally connected to the blade 20 at one end thereof and pivotally connected to an eccentric 46 mounted on the shaft 40. The motor 42 is suitably mounted on the framework 12 as shown in FIGS. 2 and 3.

Also extending generally horizontally between the two sides 16 and 18 of the framework 12 is a roll 50 of toothed wheels 52 splined to a shaft 54. As shown in FIG. 3, the wheels 52 are parallel spaced and are maintained spaced apart by spacers 56. The shaft 54 is rotatably supported by and between the upper ends 58, 59 of two swing arms 61, 62. A lower end 63 and 64 of each swing arm 61, 62 is fixed to a shaft 66 pivotally supported on the framework 12. Although shown only on the side 16 of the framework 12, each of the swing arms 61, 62 extends through a bracket 68 which completely surrounds the swing arm 61 or 62 and includes adjustable depending stops 71, 72 for limiting arcuate movement of the swing arms thereby to limit movement of the roll 50 to and from a position closely adjacent the knife blade 20. As shown, the bracket 68 includes two plates 73, 74 which straddle the swing arm 61, 62 and prevent lateral or side-to-side movement thereof. In this way, axial movement of the toothed roll 50 is minimized if not altogether prevented. Such axial movement could be induced by the reciprocating motion of the blade 20 through a section of meat being carried downwardly by the toothed roll 50.

As best shown in FIG. 1, each of the swing arms 61, 62 is resiliently biased away from the knife blade 20 by a spring 76 which holds the swing arms 61, 62 against the rearward stop 71.

The swing arms rotatably mount an idler shaft 77 which is driven by a chain 79 connected to a shaft 80 extending from a gear reducer 82 which in turn is driven through a variable drive mechanism 84 by an electric motor 86 (FIG. 3). Mounted on the shaft 54 for the roll 50 is a driven sprocket 88 which is connected by a chain 90 to an idler sprocket 78 on the shaft 77. A chain tensioning mechanism 92 including an idler sprocket 94 engaging the chain 79 is mounted on the framework 12 to maintain tension on the chain 79 when the swing arms 61, 62 are pivoted on the shaft 66.

As best shown in FIGS. 1 and 2, a lever arm assembly 98 is secured to and extends outwardly from the pivot shaft 66 to which the swing arms 61 and 62 are connected. Preferably, and as shown in the illustrated embodiment, the lever arm assembly 98 includes on each side 16, 18 of the framework 12 a first arm section 101 which is affixed to and extends horizontally outwardly from the shaft 66, a second arm section 102 extending downwardly from the first arm section 101 and a third arm section 103 which extends horizontally outwardly from the machine beneath the framework 12. An elongate bar 104 is secured to and extends between the third arm sections 103 and forms a foot pedal for foot operation by an operator of the machine 10.

As shown in FIG. 1, mounted on the framework 12 is a first limit switch 106 which is connected in series with one of the power supply lines connected to the motor 42 and a second limit switch 108 which is connected in series with one of the power supply lines connected to the motor 86. The limit switches 106 and 108 are located adjacent the path of movement of the second arm section 102 when the foot pedal-bar 104 is depressed. In this way, depression of the foot pedal 104 will not only cause movement of the roll 50 mounted at the upper ends 58, 59 of the swing arms 61, 62 arcuately horizontally toward the knife blade 20, but also will cause actuation of the motor 42 for reciprocating the knife blade 20 and actuation of the motor 86 for rotating the toothed roll 50.

In the illustrated embodiment and as best shown in FIGS. 1 and 2, a guide bar 110 is mounted above the framework 12. The guide bar 110 extends horizontally between adjustable mounting mechanisms fixed to each side 16 and 18 of the framework 12. The mounting mechanisms permit vertical adjustment of the bar 110 angularly upwardly and rearwardly from a position close to the roll 50 and on the forward side thereof to a position upwardly away from the roll 50 and to the rearward side thereof. In FIGS. 1 and 2, the bar 110 is shown in a position directly above the center position of the roll 50. The bar 110 serves to hold a section of meat 109 in place above the knife blade 20 prior to the operation of the machine 10. If desired and as shown, two vertically extending guide plates 111 and 112 can be slidably mounted on the bar 110 and are positionable adjacent opposite sides of a meat section for holding the same against twisting when the section of meat is fed downwardly past the knife blade 20. In this respect, it will be understood that certain portions of the meat tissue will be tougher than other portions and that severing of meat from bone may be easier on one side of the meat section than on the other resulting in a faster feeding of the meat section downwardly on one side of the meat section. This will cause twisting or skewing of the meat section and an undesirable feeding of the meat section past the cutting edge 22 of the knife blade 20. Accordingly, the guide plates 111 and 112 are utilized where such skewing or twisting of the meat section might occur. Parenthetically, empirical tests indicate that little skewing or twisting of the meat section is encountered when the knife blade 20 is reciprocated.

Another optional feature of the machine 10 is the provision of a pair of parallel spaced support rollers 121, 122 which are located adjacent the top of the framework 12 between the sides 16, 18 and between the knife blade 20 and the front of the machine 12. The rollers 121, 122 serve as a temporary support or resting place for meat sections prior to the sequential and individual positioning of each meat section above the knife blade 20 for feeding past the knife blade 20.

Beneath the rollers 121 and 122 is a meat receiving bin 130 wherein pieces of meat tissues separated from bone in a meat section are temporarily stored prior to the transfer of the pieces of meat tissue by the operator to a conveyor (not shown) for conveying the pieces of meat to further processing stations in a meat processing plant.

On the other side of the knife blade 20 and beneath the roll 50 is a bone receiving bin 140 into which the separated bones are fed and collected. As best shown in FIG. 4, a bone deflection plate 144 is connected to and extends rearwardly and slidewardly downwardly from the knife blade holder 23 and beneath the roll 50. The deflection plate 144 serves to deflect the bone away from the meat receiving bin 130 and rearwardly, instead of downwardly, from the roll 50. As a result, the bone deflection plate 144 serves to maintain the area in the bone bin 140 directly beneath the roll 50 substantially free of bones until the bone bin is substantially filled. The plate 144 also ensures complete severing of meat tissue from a curved end of a bone.

Figures 6, 7:
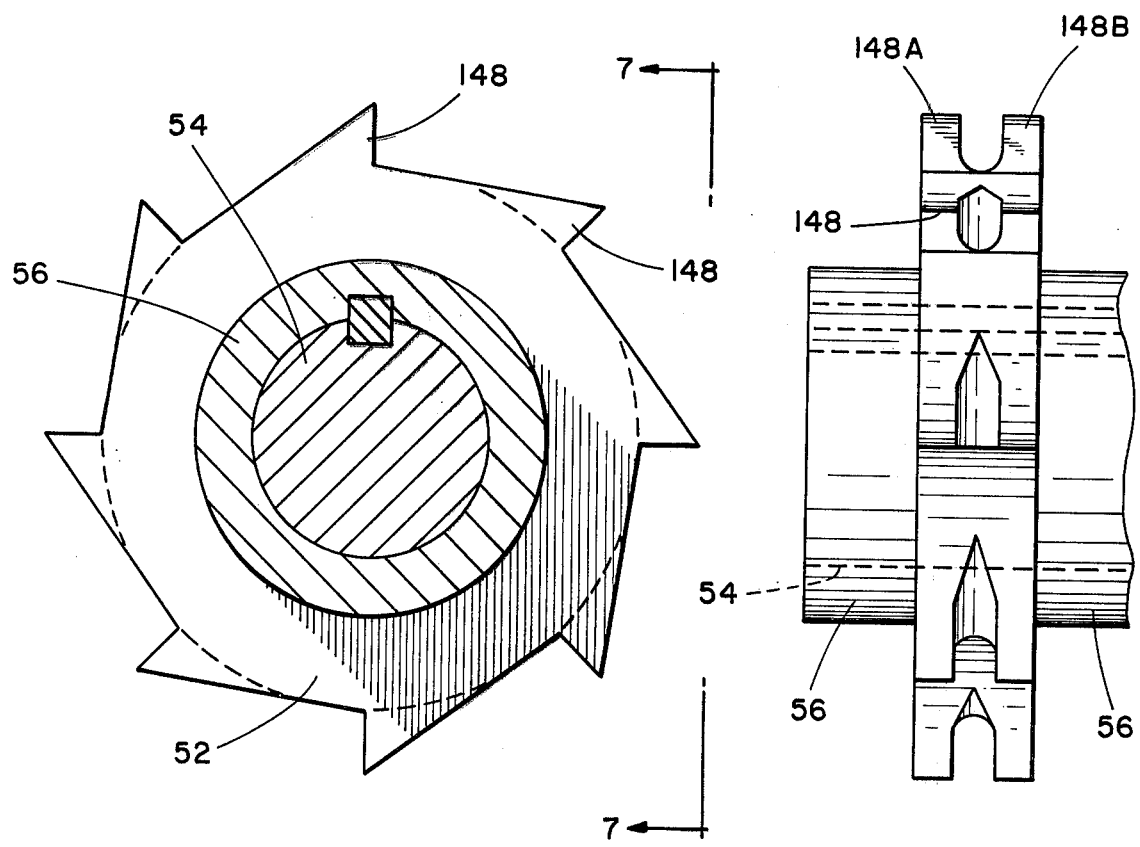
FIG. 6 is a side view of one of the toothed wheels forming the toothed roll and is taken along line 6—6 of FIG. 3.
FIG. 7 is an edge view of the toothed wheel shown in FIG. 6 viewing the same along the line 7—7 of FIG. 6.

Referring now to FIGS. 6 and 7, it is to be noted that each of the wheels 52 includes a plurality of teeth 148 each of which is bifurcated into two teeth portions 148A and 148B as shown in FIG. 7. The bifurcating or splitting of each of the teeth 148 enhances and facilitates the engaging or gripping of the teeth with the bone in a section of meat as the toothed roll 50 is rotated. Also, the forming of the roll 50 with spaced apart wheels 52 allows tissue and suet on the outer side of the bone to flow downwardly into the bone bin when and as it is separated by the rotating wheel from the bone. In this way, a build up of fat and/or tissue on the roll 50 is minimized if not altogether eliminated.

In the operation of the machine 10, an operator will take a section of meat from a supply conveyor or from the temporary supporting rollers 121 and 122 and position the same above the knife blade 20. One such section of meat 109 is shown in phantom lines in FIG. 1 in position to be fed past the knife blade 20. It will be noted that a lower end of the section of meat 109 is positioned on the knife blade 20 while the bone of the meat section is supported on the toothed roll 50 and the guide bar 110. Then the operator depresses the foot pedal-bar 104 which will first trip limit switch 106 to energize the motor 42 for reciprocating the knife blade. In this way a cutting action is first initiated. Then further downward movement of the pedal 104 will cause tripping of the limit switch 108 to start rotation of the toothed roll 50. At the same time the downward movement of the pedal 104 is causing arcuate, generally horizontal, forward movement of the toothed roll 50 towards the knife blade 20 thereby to urge the bone toward the flat back side of the knife blade 20. In this way, the operator can hold the bone against the knife blade as the meat section is being moved downwardly and the knife blade is reciprocating to sever or separate the meat tissue from the bone of the meat section. As a result, an operator is able to quickly and efficiently separate meat tissue from bone in a meat section.

Although the swing arm 61 is shown in its center position in FIG. 1, it is to be understood that the "at rest" position of the swing arms 61, 62 is adjacent the rearward stops 71 and that forward movement of the swing arms from the "at rest" position toward the knife blade 20 is limited by the forward stops 72.

Empirical tests have shown that a speed of rotation of the rolls 50 at or about 7 RPM is a satisfactory operating speed for most operators. However, it is to be understood that the roll can be rotated faster or slower depending upon the most convenient operating speed for the operator. Also, it is contemplated that in some embodiments of the machine 10 the speed of rotation of the roll 50 will be fixed.

From the foregoing description it will be apparent that the semiautomatic bone separating machine of the present invention provides a number of advantages some of which have been described above and others of which are inherent in the machine. Specifically, the machine 10 enables an operator thereof to quickly and effectively sever meat tissue from bone in a section of meat with minimal loss of meat clinging to the bone. In one test of a machine built in accordance with the teaching of the present invention, 8-inch long rib sections of meat known in the trade as "109 rib sections" were processed in 7 to 8 seconds while 10-inch long rib sections were processed in 12 to 13 seconds. Moreover, it is to be noted that the machine has a sufficient width, that is to say, the roll 50 and the knife blade 20 have a sufficient length whereby the machine can handle wide meat sections such as the sections known in the trade as "navel sections" from which flank steaks are made.

Further from the foregoing description, it will be understood that obvious modifications and variations can be made to the machine without departing from the spirit or scope of the invention. In this respect, the lever arm assembly 98 can extend from the machine 10 at a higher position above ground level so as to be hand-operated instead of foot-operated. Also, if desired, the idler sprockets could be mounted on the shaft 66 and thereby eliminate the need for the chain tensioning mechanism 92. Other obvious modifications and variations will occur to those skilled in the art. Accordingly, the scope of the invention is only to be limited as necessitated by the accompanying claims.

I claim:

1. A machine for separating the tissue from the bone in a section of meat, said machine comprising a framework having sides, an elongate knife blade having a cutting edge, said knife blade being supported by said framework and extending between the sides of said framework, rotatable means supported by said framework between said sides thereof for urging a section of meat past said cutting edge of said knife blade, and moving means manually operable during operation of said machine for moving said rotatable means to and from a position adjacent said knife blade thereby to move a section of meat positioned adjacent said rotatable means toward said cutting edge of said knife blade and such that the bone in the section of meat is moved closely adjacent said cutting edge of said knife blade whereby the tissue in the section of meat is efficiently and quickly separated from the bone.

2. The machine according to claim 1 wherein said rotatable means includes a roll rotatably supported by said framework and extending generally horizontally between said sides of said framework, said roll being parallel to and spaced from said knife blade and being movable by said moving means transversely of the axis of said roll to and from a position closely adjacent said knife blade, means on the periphery of said roll for engaging the bone of a meat section placed thereagainst, and power means for rotating said roll.

3. The machine according to claim 2 wherein said moving means includes a pair of generally upright swing arms rotatably supporting said roll therebetween, said swing arms being pivotally mounted to said framework for pivotable movement about a common axis such that said roll can be moved arcuately to and from a position adjacent said knife blade.

4. The machine according to claim 3 including a bracket fixed to each side of said framework and surrounding one of said swing arms, said brackets including stops for limiting movement of said swing arms to and from the position adjacent said knife blade, and stops for limiting side-to-side movement of said swing arms thereby to minimize if not eliminate axial movement of said roll.

5. The machine according to claim 3 wherein said moving means includes lever arm means extending outwardly from said machine and coupled to said swing arms for manually moving said swing arms about the pivot axis thereof.

6. The machine according to claim 5 including means for resiliently biasing said swing arms away from said knife blade and said lever arm means being operable to move said swing arms against the biasing action of said resilient biasing means.

7. The machine according to claim 5 wherein said lever arm means includes a foot pedal extending outwardly from said machine adjacent the bottom thereof.

8. The machine according to claim 5 including switch means for actuating said power means and wherein said switch means is operated by movement of said lever arm means to cause energization of said power means for rotating said roll.

9. The machine according to claim 8 including second power means for reciprocating said knife blade and second switch means for controlling operation of said second power means.

10. The machine according to claim 9 wherein said second switch means is operated by movement of said lever arm means and is operated prior to operation of said first switch means such that upon movement of said lever arm means said blade is reciprocated before said roll is rotated.

11. The machine according to claim 2 wherein said roll includes a plurality of spaced-apart toothed wheels with smaller diameter spacing members situated between said wheels.

12. The machine according to claim 11 wherein each of said toothed wheels includes a plurality of bifurcated teeth thereon.

13. The machine according to claim 2 wherein said power means includes an electric motor, an idler sprocket mounted on one of said arms, a driven sprocket mounted on said roll, and drive train means connecting said electric motor and said idler sprocket and said idler sprocket and said driven sprocket.

14. The machine according to claim 2 including switch means for operating said power means.

15. The machine according to claim 1 including means for reciprocating said knife blade.

16. The machine according to claim 1 including a guide bar extending horizontally between said sides of said framework and located above, and parallel spaced to, said knife blade, said guide bar being positioned to support a section of meat above said knife blade prior to the movement of the section of meat downwardly past the knife blade.

17. The machine according to claim 16 including a pair of guide plates slidably mounted on said guide bar for being positioned adjacent sides of a section of meat to prevent twisting of a section of meat as it is moved downwardly past said knife blade.

18. The machine according to claim 1 including means adjacent the top of said machine for supporting meat sections prior to the manual placement of each meat section above said knife blade.

19. The machine according to claim 1 including an elongate yieldable bone deflection plate secured to said knife blade and extending laterally outwardly and downwardly therefrom and being operative to engage and deflect a bone of a section of meat outwardly and downwardly from said knife blade.

20. The machine according to claim 1 including a bone receiving bin extending between said sides of said framework and positioned below and to one side of said knife blade and a meat receiving bin extending between said sides of said framework and positioned below and to the other side of said knife blade.

21. The machine according to claim 20 including power means for reciprocating said knife blade.

22. The machine according to claim 1 including means for limiting said manually operated movement of said rotatable means.

23. A machine for separating the tissue from the bone in a section of meat, said machine comprising a framework having an open top, an elongate knife blade having an upwardly facing cutting edge, said knife blade being supported by said framework and extending generally horizontally between the sides of said framework a short distance from said top of said framework, a roll rotatably supported by said framework and extending horizontally between said sides adjacent said top and being horizontally parallel spaced from said knife blade, means on the periphery of said roll for engaging a bone placed thereagainst, power means for rotating said roll, and manually operated means for moving said roll laterally toward and away from said knife blade during operation of said machine such that movement of said rotating roll against the bone of a section of meat placed thereagainst will move the section of meat past said knife blade thereby to separate the tissue from the bone of the section of meat.

* * * * *